United States Patent [19]

Takagi

[11] Patent Number: 5,702,156
[45] Date of Patent: Dec. 30, 1997

[54] RECLINING DEVICE

[75] Inventor: Genjiro Takagi, Akishima, Japan

[73] Assignee: Tachi-S Co., Ltd., Tokyo, Japan

[21] Appl. No.: 389,943

[22] Filed: Feb. 17, 1995

[51] Int. Cl.[6] ................................................ B60N 2/02
[52] U.S. Cl. ................................. 297/367; 297/366
[58] Field of Search ............................. 297/367, 366

[56] References Cited

U.S. PATENT DOCUMENTS 4,875,735  10/1989  Moyer et al. .................. 297/367

FOREIGN PATENT DOCUMENTS 2931915   2/1981   Germany ..................... 297/367
61-276511 12/1986  Japan .
63-22913   6/1988   Japan .
2-177908   7/1990   Japan .
2085959   5/1982   United Kingdom ........ 297/367

*Primary Examiner*—Laurie K. Cranmer
*Attorney, Agent, or Firm*—Browdy and Neimark

[57] ABSTRACT

A reclining device for a seat, having an upper arm fixed to a seat back of the seat, wherein a lock gear member may be engaged with or disengaged from a gear section formed in the upper arm through rotational action of a cam member by vertical rotation of an operation lever. The reclining device is arranged such that the cam member has a center of rotation dislocated from that of the operation lever, whereby the cam member may be rotated at a large angle even by a small rotation of the operation lever. This permits the cam member to be increased in the area for contact with the lock gear member, thus offering a stable locking and unlocking action of the reclining device for reclining adjustment of the seat back.

18 Claims, 7 Drawing Sheets

FIG. 8
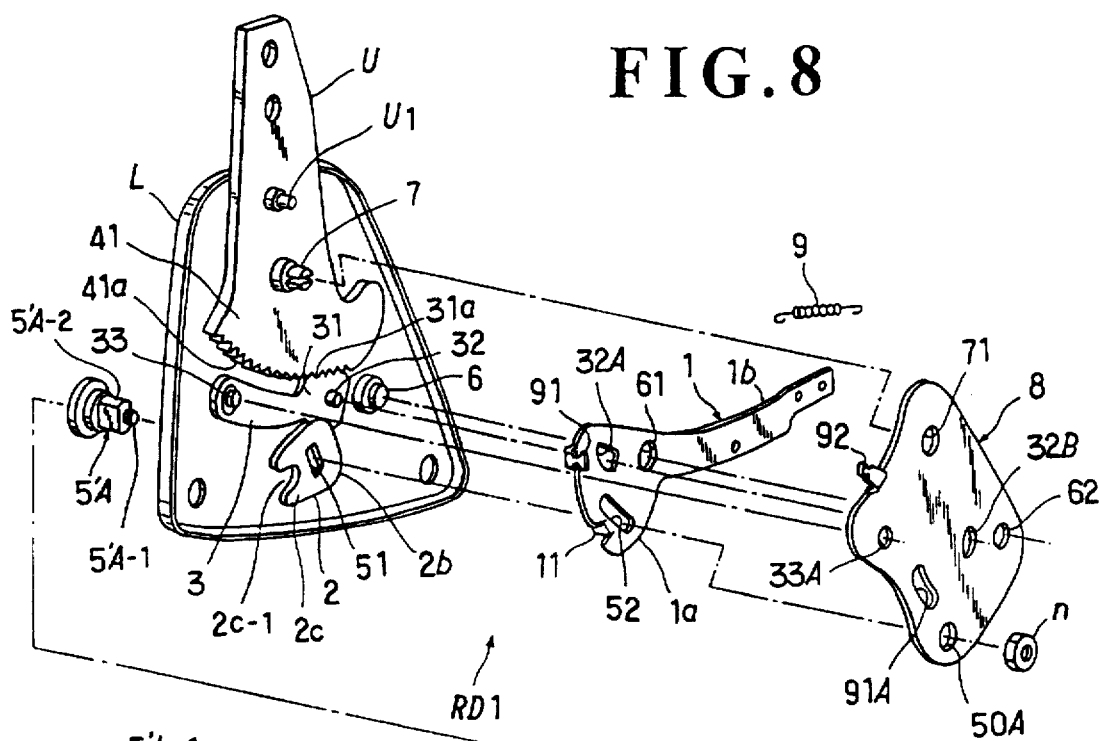
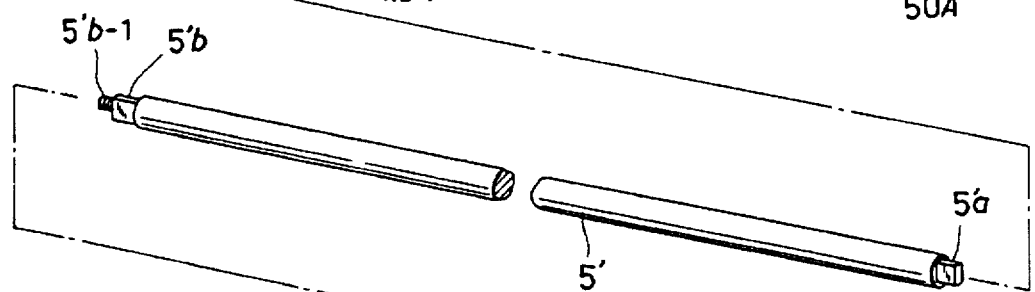
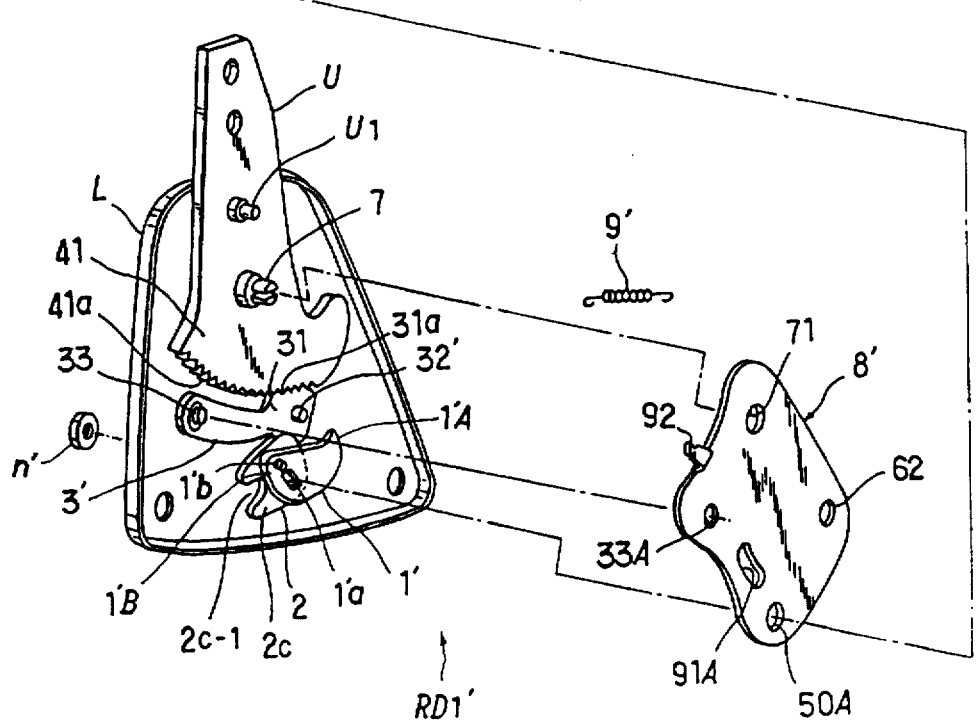

RECLINING DEVICE

BACKGROUND OF INVENTION

1. Field of the Invention

The present invention relates to a reclining device for adjustment of inclination angle of a seat back of a seat such as in automotive seat.

2. Description of Prior Art

Various sorts of reclining devices are made available for use in a seat, particularly in an automotive seat in order to permit adjustment in inclination angle of a seat back relative to a seat cushion, of the seat. Among them, there is known such type of reclining device as disclosed in the Japanese Granted Patent Pub. No. 59-15215, wherein the lower edge of a rotable upper arm fixed to the seat back is provided with a gear plate having plural teeth for mesh engagement with a lock gear member operable by an external operation lever for the reclining adjustment purpose. Referring to FIGS. 1(A) and 1(B), a typical conventional reclining device structure of this kind will be described as follows: Namely, as shown in FIG. 1(A), as with most reclining devices, the reclining device per se as designated by (U') is mounted laterally of an automotive seat (S), with the rotatable upper arm (U') thereof fixed to the lateral side of a seat back (SB) and with the a stationary lower arm (L') thereof fixed to the lateral side of a seat cushion (SC). The seat back (SB) is pivotally connected via the upper and lower arms (U')(L') to the seat cushion (SC) at a hinge pin (7) so that the seat back (SB) may be rotated about the hinge pin (7) in a direction forwardly and backwardly of the seat cushion (SC).

As shown in FIG. 1(B), a sector gear plate (4) is fixed to the lower end portion of the upper arm (U'), having an arcuate toothed part (4a), and a lock gear member (30), which has a toothed part (30a) formed in the free end portion thereof, is fixed at the base end thereof to the lower arm (L') via a pin (31) such as to be rotatable about the pin (31) in a direction for meshed engagement with or disengagement from the toothed part (4a) of gear plate (4).

The lock gear member (30) is further formed, at its free end portion, with a contact edge (30b), and an upwardly cut-away area (30c). On the other hand, an operation lever (10) is pivotally connected at its base end to the lower arm (L') via a pin (1A), with an actuate cam member (20) fixed to that pin (1A). The actuate cam member (20) has a projected contact end (20a) which is shown to be contacted with the foregoing contact edge (30b) to thereby cause the toothed part (30a) of lock gear member (30) to be meshed with the toothed part (40a) of gear plate (4). Normally, the operation lever (10) is biased by an extension coil spring (9) to retain such meshed engagement state between the lock gear member (30) and gear plate (4). With this structure, in order to unlock the reclining device (RD"), the operation lever (10) is rotated upwardly to displace the cam member's projected contact end (20a) to the cut-away area (30c), whereby the lock gear member (30) is rotated, due to gravity, downwardly about the pin (31) and disengaged from the gear plate (4).

However, this conventional structure of reclining device (RD') has been found defective in that the rotational range of the cam member (20) is just egual and limited to that of the operation lever (10) by an angel of (θ3) (generally at about 30 degrees) because both cam member (20) and lever (10) has their centers or rotation at the same point at (1A), as a result of which, the distance between the above-stated cut-away area (30c) and contact edge (30b) is made narrow, which means that the contact area between the cam member's contact end (20a) and lock member's contact edge (30d) is made quite small, leaving a problem with the stability of locking action and locking precision, of the reclining device (U').

SUMMARY OF THE INVENTION

In view of the above-stated shortcomings, it is thus a primary purpose of the present invention to provide an improved reclining device for a seat, which permits a lock gear member to be increased in the area for contact with a cam member to insure stable and precise locking and unlocking actions of the reclining device.

In order to achieve such purpose, in accordance with the present invention, there is basically provided a reclining device for a seat which comprises:

a lock gear means which is so rotatably provided at a lower arm that the lock gear means may be rotated upwardly or downwardly for meshed engagement with or disengagement from a gear section associated with the upper arm, the lock gear means having a contact edge defined at the lower side thereof;

a cam means rotatably provided at the lower arm, adjacent to the lock gear means, the cam means having a center of rotation;

the contact edge of the lock gear means being contacted upon the cam means;

an operation lever means rotatably provided at the lower arm; and a connecting means for operatively connecting the operation lever means with the cam means, whereby rotation of the operation lever means causes the lock gear means to be rotated upwardly and downwardly via the cam means so as to effect the meshed engagement or disengagement between the lock gear means and gear section, wherein the operation lever means has a center of rotation dislocated from the center of rotation of cam means.

Accordingly, because of such dislocation in center of rotation between the operation lever means and cam means, the rotational angle of the cam means may be greater than that of the operation lever means, which permits both lock gear and cam means to be increased in the area for their mutual contacts and also permits the unlocking action to be easily effected by giving a slight force to and a small mount of rotation to the operation lever means.

Preferably, the cam means may be of a small dimensions relative to the operation lever means and may further be of a shape that permits at least two different cam surfaces to be formed therein, each having a sufficient contact area upon which the contact edge of the lock gear means is to be contacted stably, so that the lock gear means may be brought to the meshed engagement with or diengagement from the gear section of said upper arm through a selected one of such at least two different cam surfaces.

In one aspect of the invention, the connecting means may comprise: an connecting lug formed at one end portion of the operation lever means, the connecting lug being disposed distant from the center of rotation of operation lever means; and a cut-away portion formed in the cam means, the cut-away portion being disposed near to the center of rotation of cam means. The connecting lug of the operation lever means is securely connected in the cut-away portion of the cam means.

In another aspect of the invention, the connecting means may comprise: a guide hole formed in one end portion of the operation lever means such as to be disposed distant from the operation lever means center of rotation; and a projection formed at the cam means such as to be disposed near to the center of rotation of cam means. The projection is inserted slidably in the guide hole.

In still another aspect of the invention, the reclining device may be of a dual type comprising a pair of first and second reclining devices, each being mounted to the respective lateral sides of the seat back, with both two reclining devices being of a same structure including the foregoing lock gear means, cam means and connecting means, except that only one of the two reclining devices includes the operation lever means, wherein the two reclining devices further each includes a guide means for assisting in downward rotation of the lock gear means for the disengagement from the foregoing gear section, such that the guide means in the foregoing one of the two reclining devices is provided between the operation lever and lock gear means, while the guide means in another thereof is provided only at the lock gear means, and wherein an interlocking means is provided between those paired reclining devices, which causes both cam and guide means to be actuated simultaneously in both two reclining devices only through rotation of the operation lever means.

Other features of the invention will become apparent from reading of descriptions, referring to the drawings.

SUMMARY OF THE INVENTION

FIG. 8 is an exploded perspective view of a third mode of reclining device in the present invention;

DETAILED DESCRIPTION OF PREFERRED EMBODIMENTS OF THE INVENTION

Figure 1:
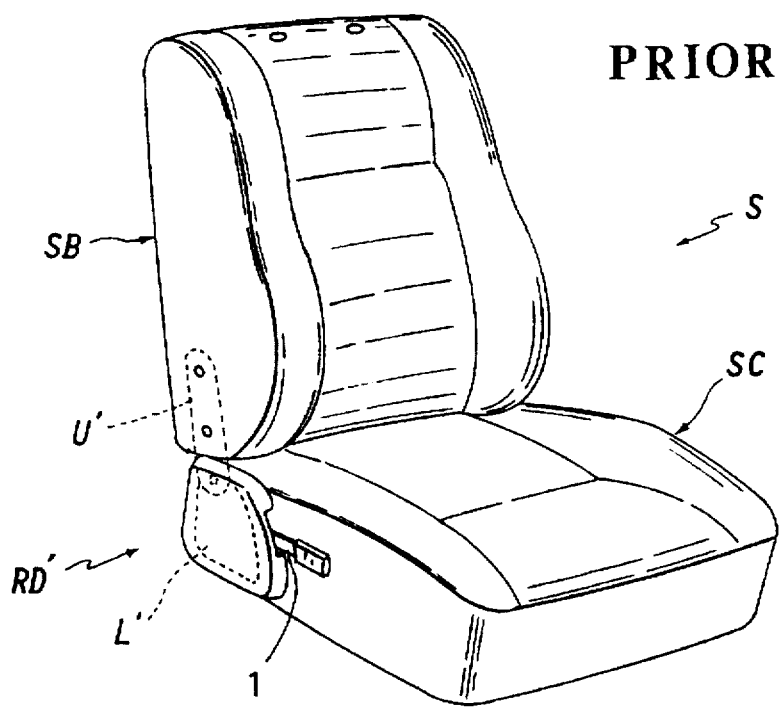
FIG. 1(A) is a perspective view of a conventional reclining device mounted on a seat.
FIG. 1(B) is a schematic side view of the conventional reclining device.
Figure 1:
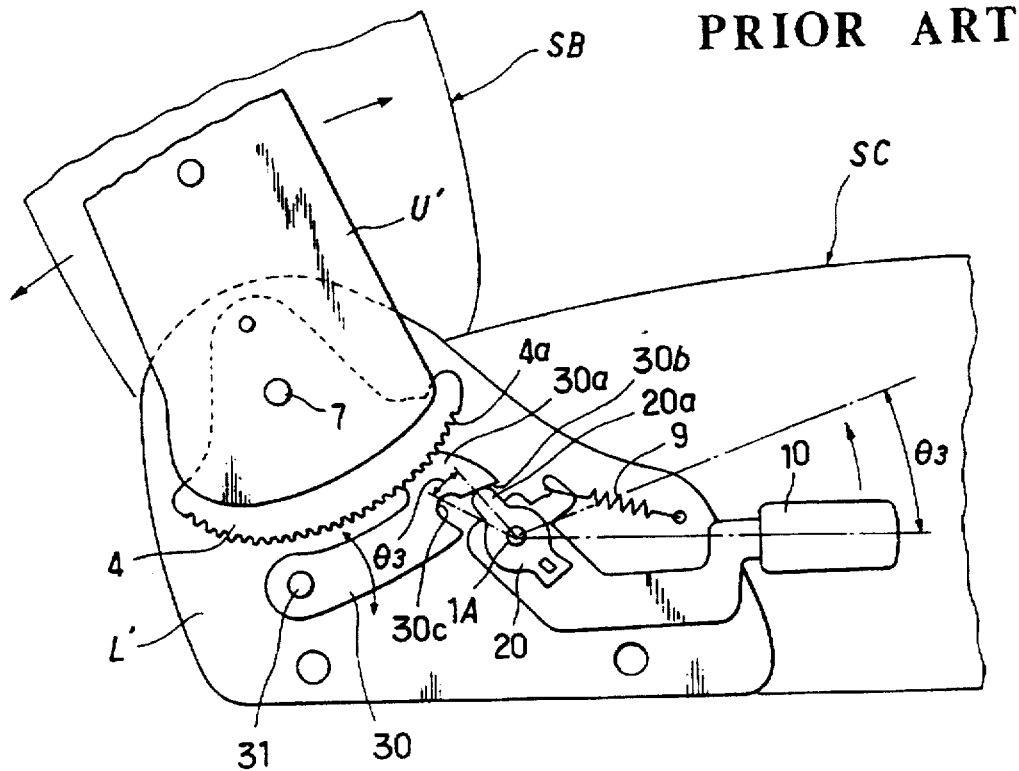

FIGS. 2(A) through 10 illustrate three preferred embodiments of reclining devices (RD1, RD2, RD1') in accordance with the present invention. It should be understood firstly that all those modes of reclining device (RD1, RD2, RD1') may be mounted to the lateral side of the automotive seat (S) as indicated in FIG. 1, and thus, all like designations to be used hereinafter correspond to all like desingations given in the FIG. 1 as well as in FIG. 2. Repetition of description on the same parts and elements among them is therefore deleted for the sake of simplicity.

Referring now to FIGS. 2(A) to 4, there is shown a first embodiment of reclining device in accordance with the present invention, by the designation of (RD).

Figure 2A:
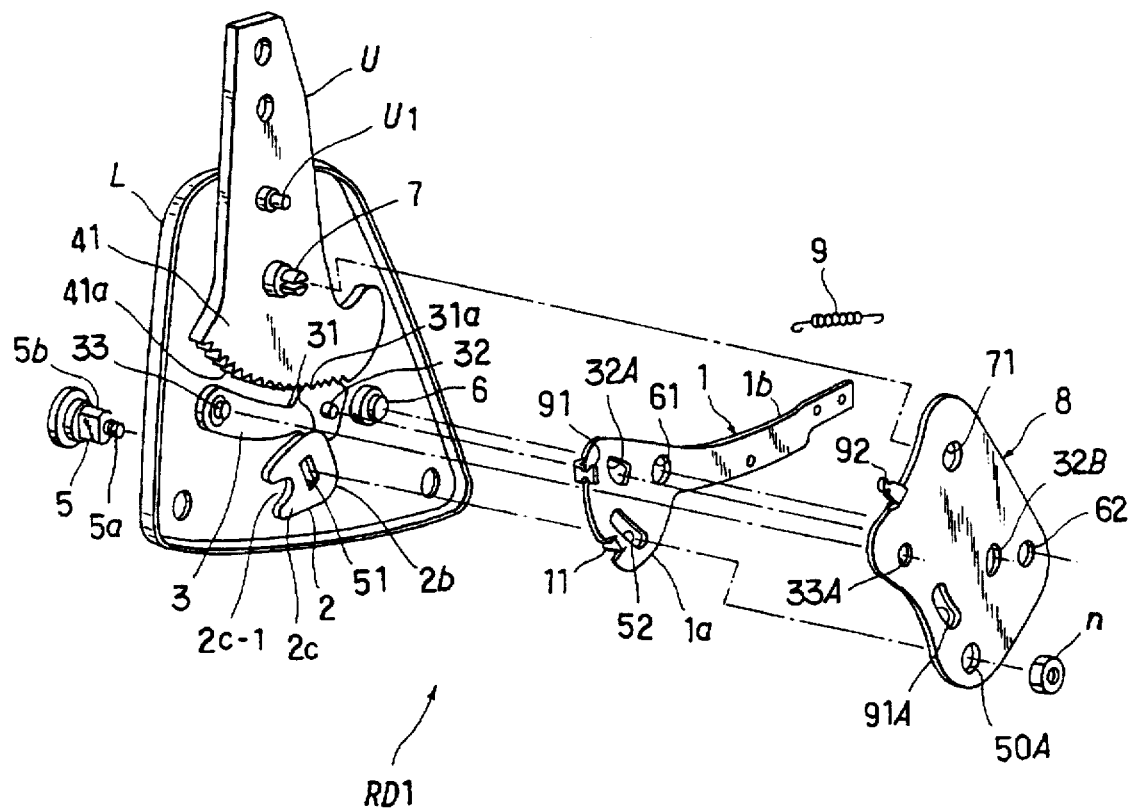
FIG. 2(A) is an exploded perspective view of a first mode of reclining device in the present invention.

As in FIG. 2(A), the first mode of reclining device (RD1) consists essentially of: a stationary lower arm (L) fixed to the lateral side of a seat cushion (SC); a rotatable upper arm (U) fixed to the lateral side of seat back (SB), the upper arm (U) being pivotally connected via a hinge pin (7) to the lower arm (L) and having an integral sector gear section (41) formed at the lower end thereof, in which a toothed part (41a) is defined in an arcuate way; a lock gear member (3) having an upper toothed part (31a) and a lower contact edge (31); a cam member (2); an operation lever (1); and a cover plate (8).

Figure 3:
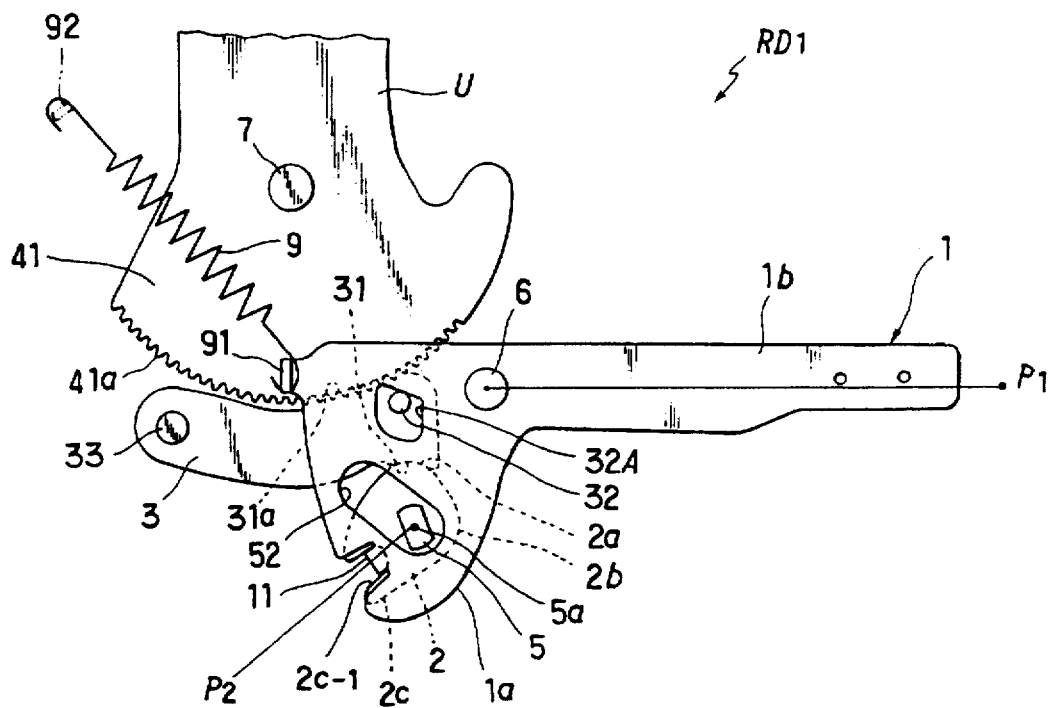
FIG. 3 is a partly broken plan view showing the locked state of the first mode of reclining device.

Specifically, as seen in FIGS. 2(A) and 3, the lock gear member (3) is pivoted via a pin (33) to the inward surface of the lower arm (L), at the base end thereof, such that the free end of the same (3) is free to be rotated upwardly and downwardly between the gear section (41) and cam member (2) with respect to the pin (33). The free end of the lock gear member (3), the above-stated upper toothed part (31a) and lower contact edge (31) are formed in a unitary manner. As will be explained later, such upper toothed part (31a) is to be meshed with the toothed part (41a) of gear section (41), while such lower contact edge (31) is to be abutted against or contacted on the cam member (2), for locking and unlocking purpose. The lock gear member (3) is further formed with a guide pin (32) at the free end thereof.

The cam member (2) is formed in an eccentric way such that the non-circular securing hole (51) is defined eccentrically therein (as best seen in FIG. 3), thus having two discrete cam surfaces: a high-level first cam surface (2a) and a low-level second cam surface (2b). The cam member (2) is securely fitted at such hole (51) to the non-circular portion (5b) of a pin (5). The pin (5) is rotatably secured in a hole (not shown) formed in the lower arm (L), and thus it is to be understood that the cam member (2) is free to rotate about the pin (5) to selectively permit one of the first and second cam surfaces (2a)(2b) to be oriented towards the contact edge (31) of lock gear member (3). The cam member is also formed with a connecting cut-away portion (2c-1) at another end (2c) thereof.

The operation lever (1) is so formed to have a rectilinear rod section (1b) and a downwardly expanding planar section (1a) defined therein in a unitary manner. As best shown in FIG. 3, the downwardly expanding planar section (1a) has, formed therein, a guide hole (32A), an escapement hole (52), a connecting lug (11) and a spring securing lug (91). The connecting lug (11) projects in an inward direction towards the inward surface of lower arm (L), and the spring securing lug (91) projects outwardly in a direction opposite to the connecting lug (11).

As understandable from FIGS. 2(A) and 3, the operation lever (1) is rotatably secured at its hole (61) to a pin (6) fixed on the inward surface of lower arm (L). But, before this assemblage, the guide pin (32) of lock gear member (3) and the non-circular portion (5b) of pin (5) should be inserted in the guide hole (32A) and escapement hole (52) of operation lever (1), respectively, while the connecting lug (11) of operation lever (1) is engaged in the connecting cut-away portion (2c) of cam member (2), to provide such mechanical assembly as in FIG. 3 upon the planar inward surface of lower arm (L).

The cover plate (8) is of a size that can be attached within the lower arm (L), and is formed with an upper securing hole (71), a lower securing hole (50A), a first escapement hole (91A), a second escapement hole (32B), two support holes (33A)(62) and a spring securing lug (92).

In attaching this cover plate (8) to the above-assembled lower arm (L), the pin (33) for the lock gear member (3) and the pin (6) for the operation lever (1) are fitted rotatably in the two support holes (33A)(62), respectively, whereas the guide pin (32) of lock gear member (3) and spring securing lug (91) are inserted through the first and second escapement holes (91A) (32B), respectively, and further, the hinge pin (7) and the threaded end portion (5a) of pin (5) are inserted in the upper and lower securing holes (71)(50A), respectively. As can be seen in FIG. 2(A), the hinge pin (7) has a split end which is resiliently secured in the upper securing hole (71) and the threaded end portion of pin (5) is threadedly engaged with a nut (n) via a washer (not shown), so as not only to prevent the cover plate (8) against removal from the lower arm (7) but also to permit smooth rotation of both upper arm (U) and pin (5).

A tension coil spring (9) is extended between the two spring securing lugs (91)(92) to bias the operation lever (1) in a direction to a non-use horizontal position as shown in FIG. 3. In other words, the forward end portion (at (1a)) of operation lever (1) is biased by the spring (9), tending thus to rotate clockwise, but the non-circular portion (5b) of the pin (5) is contacted with the lower end of the escapement hole (52), serving as a limit against such upwardly biased forward portion of operation lever (1), whereupon, normally in the non-use state, the operation lever (1) is kept in such a horizontally extending state as in FIG. 3.

Figure 2B:
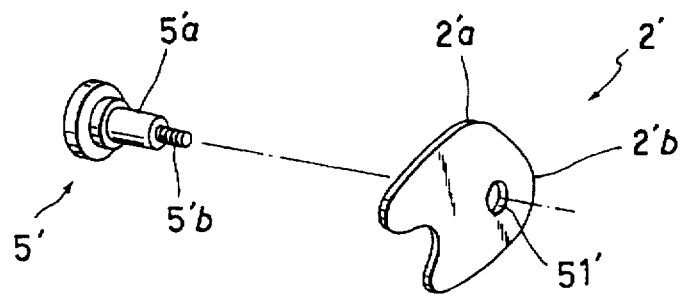
FIG. 2(B) is a diagram of another mode of cam member and pin in the present invention.

FIG. 2(B) shows another mode of cam member and its associated pin, as indicated by (2') an d (5') respectively, in place of the foregoing ones (2)(5). The cam member (2') and pin (5') is basically similar to those (2)(5) described above, except that the former (2') has a circular eccentric hole (51') and the latter (5') has a circular portion (5'a). However, both cam member (2 or 2') and pin (5 or 5') are not limited to the illustrated ones, but may be of any other shaped insofar as they serve the functions intended by the present invention.

As shown in FIG. 3, in the non-use state of the present reclining device (RD1), the cam member (2) is retained at a position orienting its first cam surface (2a) towards the contact edge (31) of lock gear member (3), or actually contacting the same (31), thereby placing the lock gear member (3) in a locked position where the toothed part (31a) thereof is meshed with the toothed part (41a) of gear section (41), so that the upper arm (U) or seat back (SB) is locked with respect to the lower arm (L) or seat cushion (SC). Now, as in FIG. 4, if it is desired to unlock the present reclining device (RD1) for reclining adjustment of the seat back (SC), an operator should rotate the rearward end portion (1b) of operation lever (1) upwardly or counterclockwise relative to the pin (6). Then, the forward end portion (1a) of the same. lever (1) is also rotated in the same counterclockwise direction, which in turn causes the cam member (2) to be rotated about the pin (5), bringing the second cam surface (2b) under the lock gear member's contact edge (31). Because of eccentricity of the cam member (2), the second cam surface (2b), as mentioned above, presents a lower level than the first one (2a) against that contact edge (31), and therefore, the lock gear member (3) is rotated clockwise or downwardly, due to a gravity, relative to the pin (33). In addition to the gravity, a downward displacement of the guide hole (32A), which is caused by the present rotation of operation lever (1), pushes and lowers the guide pin (32) of the lock gear member (3), thereby assisting in the downward rotation of the lock gear member (3) towards the second cam surface (2a). Consequently, the toothed part (31a) of lock gear member (3) is disengaged from the gear section (41) of upper arm (U), whereby the seat back (SB) is unclocked from the seat cushion (SC), and thus rotatable forwardly and backwardly with respect thereto.

Designation (U1) in FIG. 2A denotes a securing pin to which one end of a spiral spring (not shown) is secured. The spiral spring is a well known means for biasing the seat back (SB) forwardly towards the seat cushion (SC). Therefore, the seat back (SB) may be locked and unlocked under such forward biasing force of spiral spring.

Figure 4:
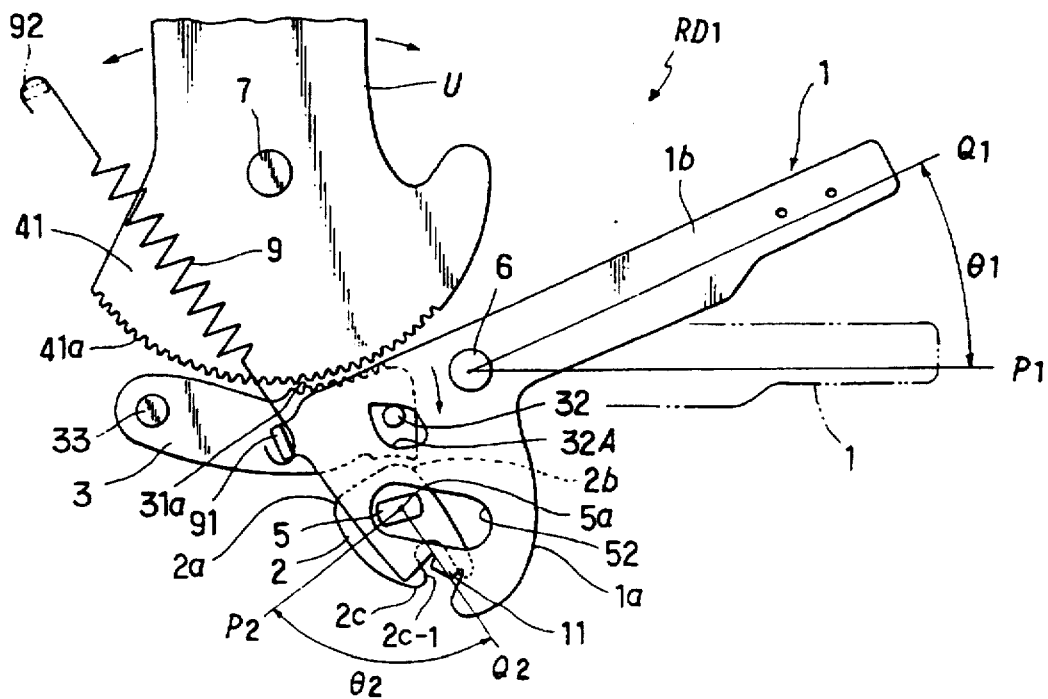
FIG. 4 is a partly broken plan view showing the unlocked state of the same first mode of reclining device.

As constructed above, it is appreciated from FIGS. 3 and 4, that by rotating the operation lever (1) only at such small angle ($\theta 1$) as approx. 30 degrees, from the non-use horizontal position ((P1) upwards to an unlocking position (Q1), the cam member (2) is rotated by connecting lug 11 which is slidably engaged in cut-away portion (2C-1) of cam 2 at an angle ($\theta 2$) of approx. 90 degrees around the center of the pin (5). The reason therefor is that (i) the center (5) of rotation for the cam member (2) is spaced from that of the center of rotation of pin (6) for the operation lever (1), and (ii) the rectilinear portion (1b) of the operation lever (1) extends long, as indicated by the line between the pin (6) and the rearward end of operation lever (1), which forms a large radius of a circle having a center at that pin (6), in comparison with the small size of the cam member (2) equivalent generally to a small radius of a circle along which the free end (2c) of cam member (2) is rotated. Additionally, because of this large rotational angle of the cam member (2) and in view of the cam member (2) per se being formed in a flat plate shape, each of the two cam surfaces (2a)(2b) thereof may be increased in the area for contact with the contact edge (31) of lock gear member (3), which also permits such contact edge (31) to be increased in the area for contact with one of those two cam surfaces (2a)(2b).

Accordingly, in accordance with the present invention, a strength of the cam member (2) is improved greatly for receiving the lock gear member (33) and also, improved is the engagement condition between the cam and lockgear members (2)(33), thereby assuring a stable and precise locking/unlocking actions of the reclining device for inclination adjustment of the seat back (SB).

Figure 5:
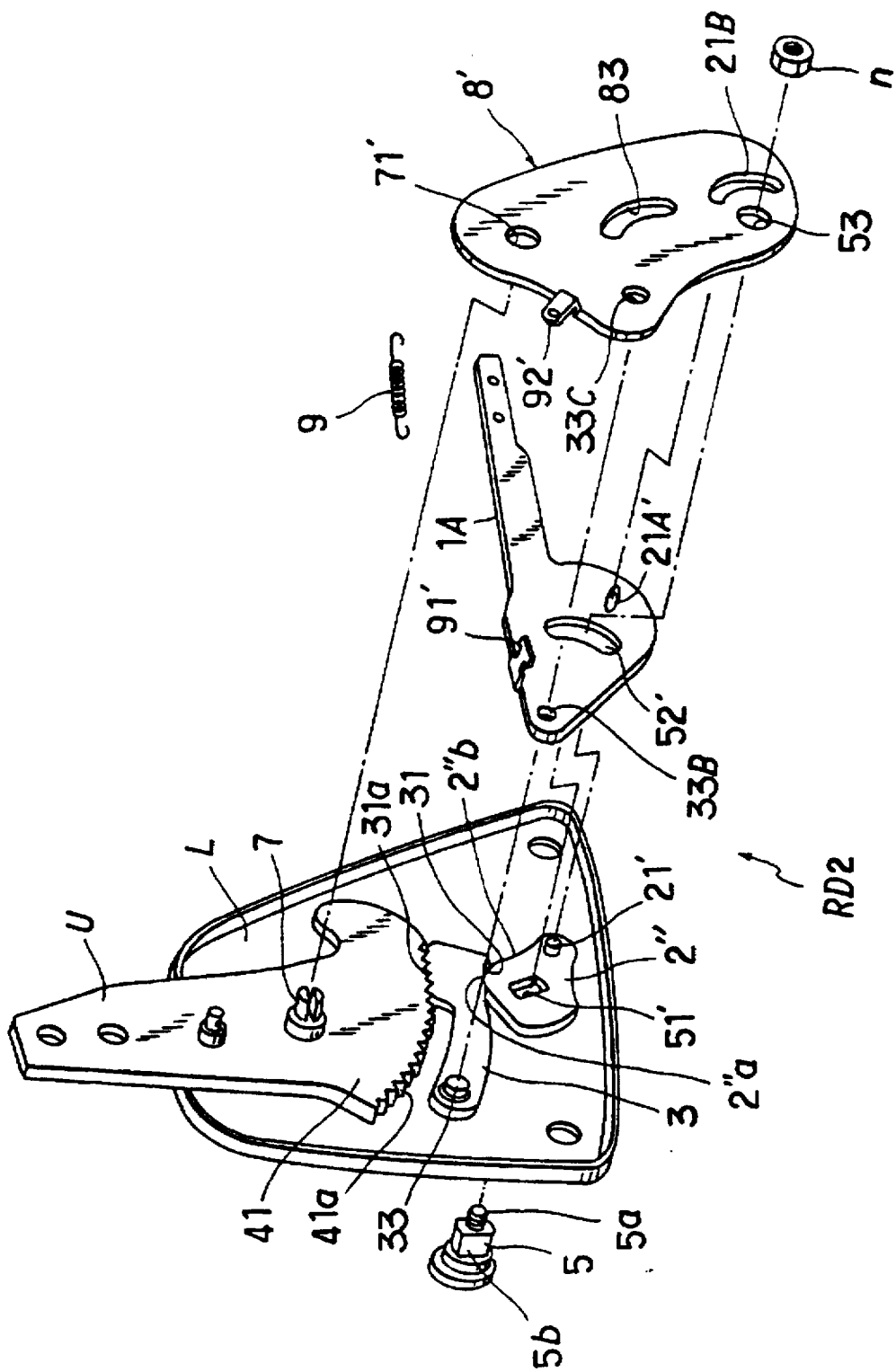
FIG. 5 is an exploded perspective view of a second mode of reclining device in the present invention.
Figure 6:
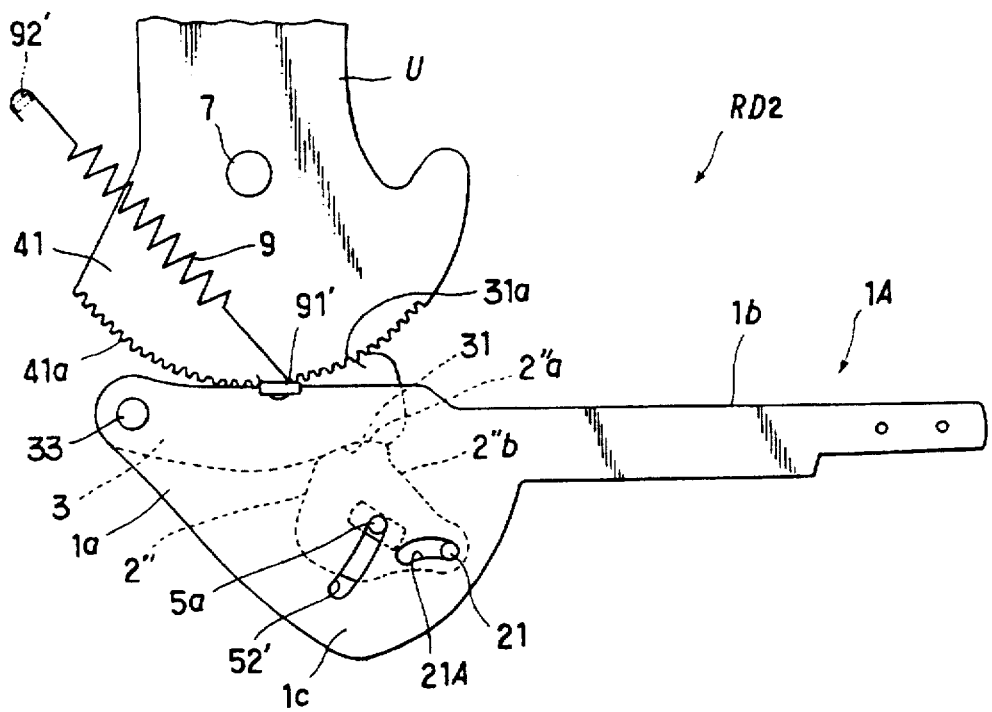
FIG. 6 is a partly broken plan view showing the locked state of the second mode of reclining device.
Figure 7:
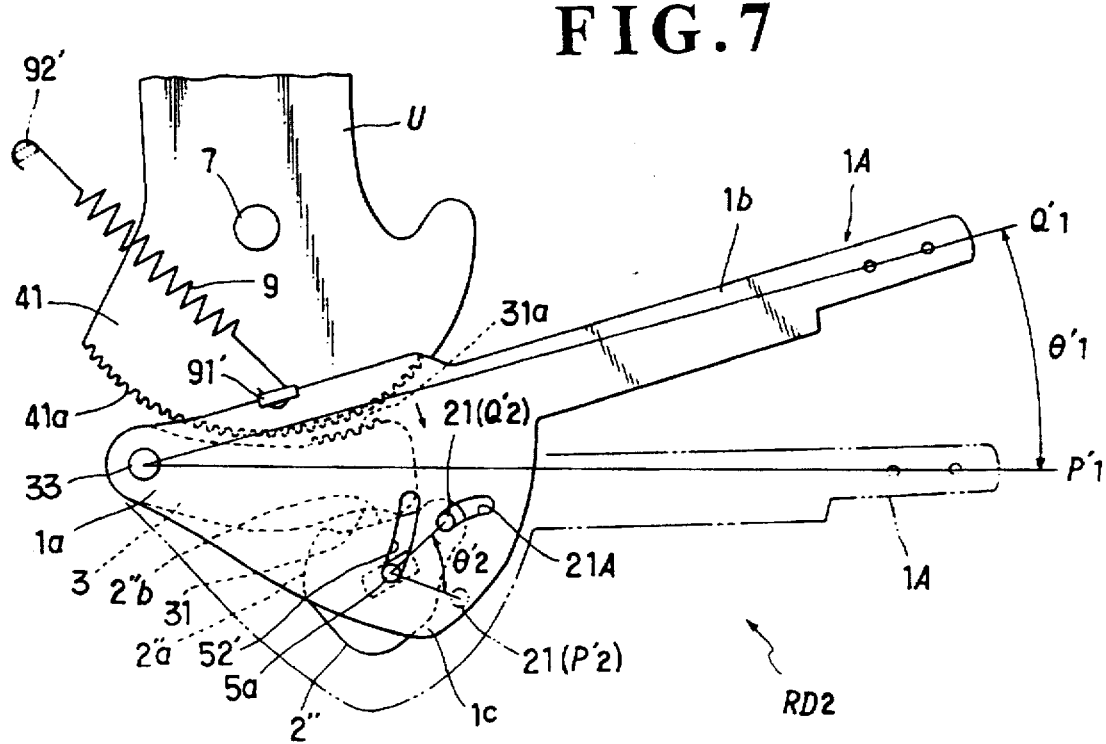
FIG. 7 is a partly broken plan view showing the unlocked sate the same second mode of reclining device.

The above-discussed features and effects of the present invention may be embodied by a slight change of design into another embodiment as illustrated in FIGS. 5 to 7. Namely, a second mode of the reclining device (RD2) is provided, which suggests different configurations of cam member (2"), operation lever (1A) and cover plate (8') than those of the above-described first embodiment (RD1). But, other constituent elements (e.g. the lower and upper arms (L)(U), the pin (5), etc) of this second embodiment are identical to those of that first embodiment, and all like designations to be used hereinafter correspond to all like designations given in the first embodiment above. The same parts and elements between the first and second embodiments will not be explained for the sake of simplicity.

In this particular embodiment, the cam member (2") comprises: a first cam surface (2"a); a second cam surface (2"b), wherein both first and second cam surfaces (2"a)(2"b) are formed continuous from each other at the upper side of cam member (2"), presenting two discrete cam surfaces there; a non-circular securing hole (51') which is disposed eccentrically away from the first cam surface (2"a) in the cam member (2"), and an integral projected portion (21) disposed at the lower side of cam member (2"). The cam member (2") is fitted securely at its non-circular hole (51') to the non-circular portion (5b) of the pin (5) and rotatably supported thereon inwardly of the lower arm (L), as shown in FIG. 5. The operation lever (1A), as similar to the one (1) in the first embodiment above, basically includes a rearward rod section (1b) and a downwardly expanding planar section (1c). This lever (1A) is formed with a hole (33B) at its forward end portion (1a) and fitted rotatably at such hole (33B) onto the pin (33) which supports the lock gear member (3), so that the lever (1A) is rotatable upwardly and downwardly relative to the pin (33).

Formed in the downwardly expanding planar section (1c) of operation lever (1A) are a generally vertically extending arcuate escapement hole (52') and a generally horizontally extending arcuate guide hole (21A). The escapement hole (52') is formed in conformity with an arc of circle having a center at the pin (33), through which hole (52'), the pin (5a) projects. Thus, along this escapement hole (52'), the operation lever (1A) is allowed to be rotated without interference with the projected pin (5a). The guide hole (21A) is formed in a given upwardly arcuate way, as best seen in FIG. 6. Such upwardly arcuate or curved formation of guide hole (21A) is based on a given locus described by the projected portion (21) of cam member (2") in order to allow the cam member (2") per se to be rotated smoothly about the pin (5) by upward and downward rotation of the operation lever (1A). That is, the guide hole (21A) is of an acurate shape along which the cam member's projected portion (21) is so guided as to cause the body of cam member (2") to rotate clockwise or counterclockwise about the pin (5) in synchronism with the upward or downward rotation of the lever (1A). Designation (91') denotes a spring securing lug formed on the upper side of the operation lever (1A). One end of the tension coil spring (9) is secured to that securing lug (91').

The cover plate (8') is formed with an upper securing hole (71'), in which the split end of the hinge pin (7) is secured resiliently, and a lower securing hole (53), through which the threaded end part (5a) of the pin (5) passes rotatably. The threaded end part (5a) is threadedly engaged with the nut (n). At those two secured points, the cover plate (8') is firmly attached to the lower arm (L). The cover plate (8') is further formed with a first arcuate escapement hole (83) along which the spring securing lug (91') is freely dispalced, a second arcuate escapement hole (21B) along which the cam member's projected portion (21') is freely dispalced, and a circular hole (33C) through which the pin (33) passes rotatably.

Designation (92') denotes another spring securing lug formed in the upper side of the cover plate (8'), to which securing lug (92'), another end of the foregoing coil spring (9) is secured. Thus, the spring (9) is extended between the two securing lugs (91')(92') as shown in FIG. 6. In this non-use state, the spring (9) is so expanded with respect to the operation lever (1A) as to create a toggle effect, which acts to retain the lever (1A) in the non-use horizontal position as in FIG. 6. Therefore, when rotating the operation lever (1A) upwardly as in FIG. 7, the spring (9) restores its contracting action tending to pull the lever (1A) upwardly, thereby assisting in smooth rotation of the same up to a given use position indicated by (Q'1).

The first escapement hole (83) is shaped along an arc of circle having a center at the pin (33), while the second escapement hole (21B) is shaped along an arc of circle having a center at the pin (5). Hence, when the operation lever (1A) is rotated vertically relative to the pin (33), both spring securing lug (91') and projected portion (1') are smoothly rotated with respect to their respective centers of rotation, i.e. the pin (33) and the pin (5), without interference from the cover plate (8') per se.

With the above-described arrangement, as shown in FIG. 7, rotating the operation lever (1A) vertically at the angle of (θ'1) between the non-use position (P'1) and use position (Q'1) causes the cam member (2") to rotate about the pin (5) at the angle of (θ'2) between the two displacement points (P'2)(Q'2) corresponding respectively to those non-use and use positions (P'1)(Q'2), so as to selectively bring the lock gear member (3) to a meshed engagement with or disengagement from the gear section (41) of upper arm (U) via a selected one of the two cam surfaces (2"a)(2"b) of cam member (2"). In this regard, as same with the first embodiment, upward rotation of the lever (1A) presents the low-level cam surface (2"b) to allow the lock gear member (3) to be rotated downwardly due to gravity and thus disengaged from the gear section (41), while conversely, downward rotation of the lever (1A) presents the high-level cam surface (2"a), bringing the lock gear member (3) to meshed engagement with the gear section (41). In that way, the seat back (SB) may be locked and unlocked with respect to the seat cushion (SC) for the reclining adjustment.

Accordingly, similarly to the first embodiment, it is to be appreciated, with reference to FIG. 7, that the center of rotation (at (33)) for the operation lever (1A) is dislocated from the that (5) for the cam member (2"), and the rotational angle (θ'2) of cam member (2") is much greater than that (θ'1) of operation lever (1A). Strictly stated, according to the diagram shown in FIG. 7, the lever (1A) may be rotated at approx. 30 degrees relative to the pin (33), whereas by contrast, the cam member (2") may be rotated about the pin (5) at approx. 60 degrees; namely about twice as much angle as that of the operation lever (1A). Therefore, the second mode of reclining device (RD2) also permits each of the two cam surfaces (2"a)(2"b) to be increased in the area for contact with the contact edge (31) of lock gear member (3), and further permits that contact edge (31) to be increased in the area for contact with one of those two cam surfaces (2"a)(2"b).

Figure 9:
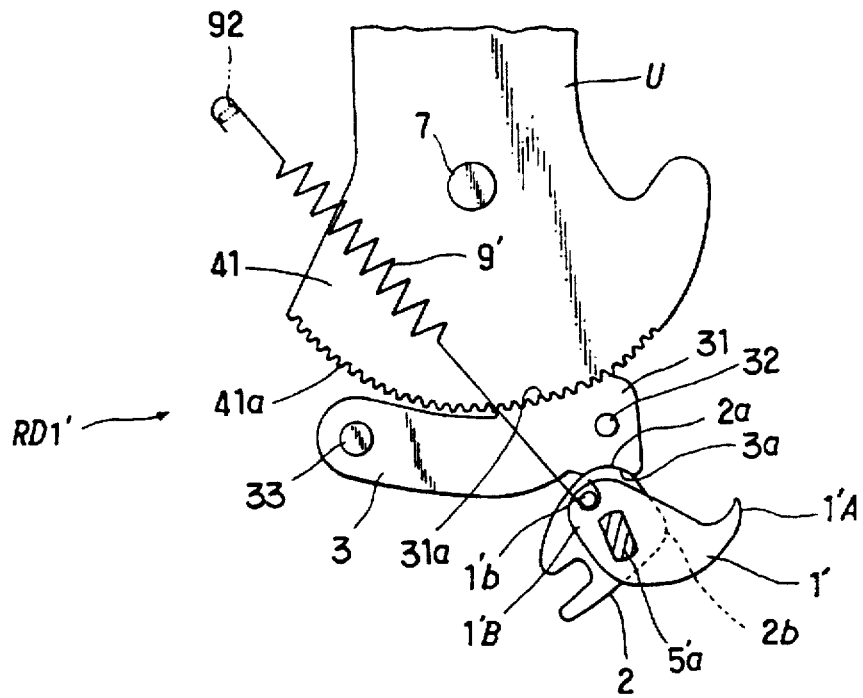
FIG. 9 is a partly broken plan view showing the locked state of the third mode of reclining device.
Figure 10:
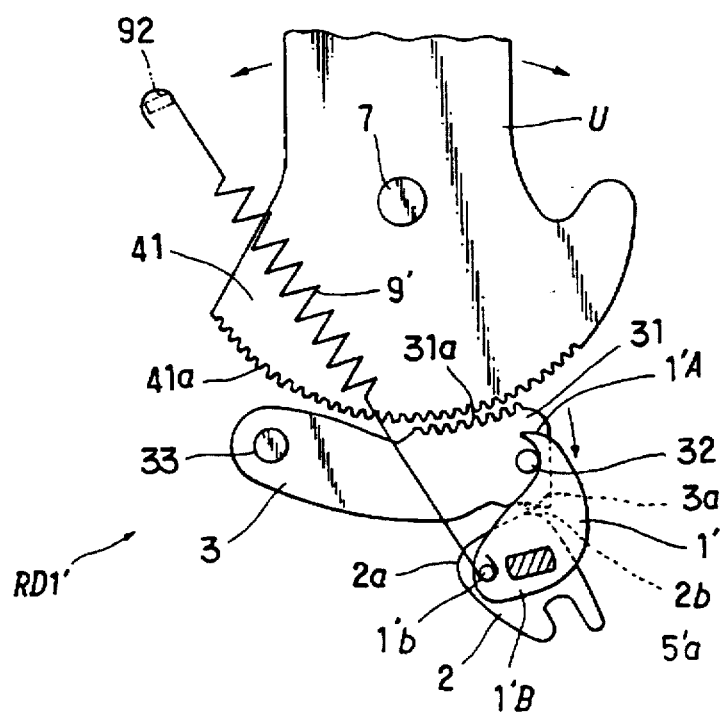
FIG. 10 is a partly broken plan view showing the unlocked state of the same third mode of reclining device.

FIGS. 8 to 10 show a third embodiment of the present invention, wherein there are provided a dual-type reclining device which includes another second reclining device (RD1') in addition to the aforementioned first mode of reclining device (RD1), so that the two reclining devices (RD1)(RD1') may be mounted to the respective lateral sides of the seat (S). BasicallY, such paired reclining devices (RD1)(RD1') are identical in structure with each other. They are of the same structure with that of the previously described first mode of reclining device (RD1) and any detailed description will not be made thereof. However, this particular mode employs an interlocking means for causing a simultaneous locking and unlocking action between the two reclining devices (RD1)(RD1'). The interlocking means is depicted in FIG. 8 as comprising a connecting rod (5'), a pin (5'A), and an auxiliary lever (1').

The pin (5'A) is also identical with the above-described one (5), having same non-circular and threaded portions (5'A-2)(5'A-1) with those (5b)(5a) of the latter (5), but as can be seen from FIG. 8, the pin (5'A) is formed at its outward end with a rectangular recess into which is fit secured one rectangular end (5'a) of the connecting rod (5), though not shown.

The auxiliary lever (1') is generally of a comma shape, as illustrated, having a hook-like tapered engagement end portion (1'A) to be engaged over the projected portion (32) of the lock gear member (3) and an widened base portion (1'B) where a non-circular securing hole (1'a) is formed, as shown in FIG. 8, the securing hole (1'a) being of the same size with that (51) of the cam member (2) associated with the second reclining device (RD1'). An integral projection (1'b) is formed in one corner area of the base portion (1'B) of auxiliary lever (1') opposite to the hooklike engagement end portion (1'A) thereof.

Basically, the second reclining device (RD1') is assembled in the same manner as described in the first embodiment above, but the difference thereof from the first reclining device (RD1) is that the auxiliary lever (1') should be juxtaposed with the cam member (2) within the lower arm (L) as shown in FIG. 8, so that both non-circular holes (51)(1'a) of auxiliary lever (1') and cam member (2) are aligned together. Hence, in attaching a cover plate (8') to the lower arm (L), another non-circular portion (5'b) and threaded portion (5'b-1) of the connecting rod (5') should be inserted through the lower hole (50A) and fitted into the thus-aligned two non-circular holes (51)(1'a). Finally, the threaded end (5'b-1) of connecting rod (5') is engaged threadedly with the nut (n').

A tension coil spring (9') is extended between the spring securing lug (92) and projection (1'b) such as to biasingly cause both cam member (2) and auxiliary lever (1') to tend to rotate clockwise, as shown in FIG. 9, toward a non-use position where the cam member (2) presents its first cam surface (2a) to set the lock gear member (3) in a meshed engagement with the gear section (41) of upper arm (U) and the hook-like engagement end portion (1'A) of auxiliary lever (1') is disengaged from the projected portion (32) of lock gear member (3).

Thus, a rotation force applied to the operation lever (1) in the first reclining device (RD1) may be transmitted via the connecting rod (5') to the auxiliary lever (1') in the second reclining device (RD1'), so that both lock gear members (3)(3) in both first and second reclining devices (RD1)(RD1') may be simultaneously brought to meshed engagement with or disengagement from their corresponding gear sections (41)(41). Specifically stated, referring to FIGS. 9 and 10, when rotating upwardly the operation lever (1) as shown in FIG. 4, the cam member (2) in the first reclining device (RD1) is caused to rotate clockwise, which in turn simultaneously causes rotation of both pin (5'A) and connecting rod (5') in the same direction- As a result thereof, both cam member (2) and auxiliary lever (1') in the second reclining device (RD1') are caused to rotate in the same clockwise direction, whereupon both cam members (2)(2) respectively in the first and second reclining devices (RD1) (RD1') present their respective low-level second cam surfaces (2b)(2b) to allow natural downward rotation of both lock gear members (3)(3) due to gravity, thus disengaging them (3)(3) all from their respective gear sections (41)(41), while at the same time, both guide hole (32A) of operation lever (1) and hook-like engagement end portion (1'A) of auxiliary lever (1') respectively in the first and second reclining devices (RD1)(RD1') are caused to rotate clockwise to engage on the corresponding lock gear member's projected portions (32)(32), as shown in FIGS. 4 and 10, thereby assisting in smooth downward rotation of both lock gear members (3)(3) to insure disengagement of them from their corresponding gear sections (41)(41).

In the present third embodiment, it is apparent that both two reclining devices (RD1)(RD1') attain the same features and effects as described in both first and second embodiments above. Namely, the two cam surfaces (2a)(2b) in each cam member (2) may be increased in the area for contact with the contact edge (31) of each lock gear member (3), and the cotatct edge (31) may also be increased in the area for contact with one of the two cam surfaces (2a)(2b). Moreover, in this particular third embodiment, most of same parts and elements can be used commonly between the two reclining devices (RD1)(RD1'), only excepting the connecting rod (5') and auxiliary lever (1'), which is quite advantageous in reducing costs and simplifying the assembling process for producing the reclining devices.

While having the present invention thus far, it should be understood that the invention is not limited to all of the illustrated embodiments, but any other modifications, replacements and additions may be structurally applied thereto without departing from the scopes of the appended claims.

What is claimed is:

1. A reclining device for a seat, which includes an upper arm adapted to be fixed to a seat back of the seat and a lower arm adapted to be fixed to a seat cushion of the seat, said upper arm being rotatable with respect to said lower arm, said upper arm having a gear section at a lower end thereof, said reclining device comprising:

a lock gear means rotatable downward or upward on said lower arm to respectively permit meshed engagement or disengagement from said gear section, said lock gear means having a contact edge defined at a lower side thereof;

a cam means rotatably mounted on said lower arm adjacent to said lock gear means, said cam means having a first center of rotation defined therein, and a first end portion and a second end portion, wherein said second end portion includes at least two different cam surfaces, each having a contact area upon which said contact edge of said lock gear means can be stably engaged;

said at least two different cam surfaces including a first cam surface spaced from said first center of rotation which rotates said lock gear means upwardly for the meshed engagement with said gear section and a second cam surface spaced from said first center of rotation to permit said lock gear means to be rotated downwardly for disengagement from said gear section;

an operation lever means rotatably provided on said lower arm, said operation lever means having a second center of rotation, a generally rectilinear section defined at a first end thereof and a downwardly expanding section defined at a second end thereof opposite to said first end, such that the second center of rotation is defined between said generally rectilinear section and said downwordly expanding section and is spaced from said first center of rotation;

said downwardly expanding section substantially overlapping said cam means; and connecting means on said downwardly expanding section and said cam means for slidable and continuous engagement between said operation lever means and said cam means to rotate said cam means into meshed engagement or disengagement, whereby rotation of the operation lever means causes said lock gear means to be rotated upwardly and downwardly by rotation of said cam means so as to effect meshed engagement or disengagement between said lock gear means and said gear section;

wherein a guide means is provided between said lock gear means and said downwardly expanding section of said operation lever means in order to assist in downward rotation of said lock gear means for the disengagement from said gear section.

2. The reclining device according to claim 1, wherein said connecting means is spaced from said second center of rotation on said operation lever means and near said first center of rotation on said cam means, so that rotation through an angle θ1, θ'1 upward or downward of said rectilinear section of said operation lever causes said cam means to rotate through an angle θ2, θ'2 which is at least a multiple larger than the angle θ1, θ'1 of rotation of said rectilinear section, thereby permitting both quick orientation of one of said at least two cam surfaces toward said contact edge of said lock gear means, and permitting said contact edge to be increased in an area for contact with said one of said at least two cam surfaces.

3. The reclining device according to claim 2, wherein when angle θ1, θ'1 is approximately 30° angle, θ2, θ'2 is approximately 90°.

4. The reclining device according to claim 2, wherein angle θ2, θ'2, is approximately three times angle θ1, θ' when said rectilinear section is rotated.

5. The reclining device according to claim 1, wherein a longitudinal axis of said cam means is shorter than a longitudinal axis of said operation lever means, said cam means having a shape that permits at least two different cam surfaces to be formed thereon, each of said cam surfaces having a sufficient contact area upon which said contact edge of said lock gear means can be stably engaged.

6. The reclining device according to claim 1, wherein an area of said cam means is of smaller area than that of said downwardly expanding section of said operation lever, said cam means being located substantially within the area of said downwardly expanding section, and wherein said lock gear means is so disposed as to be engageable between said gear section of said upper arm and said cam means within the area of said downwardly expanding section.

7. The reclining device according to claim 1, wherein said connecting means comprises: a connecting lug formed on said downwardly expanding section of said operation lever means, said connecting lug being disposed a distant from said second center of rotation on said operation lever means; and a cut-away portion formed in said first end portion of said cam means, said cut-away portion being disposed near to said first center of rotation on said cam means, and wherein said connecting lug of the operation lever means is slidably and continuously engaged in said cut-away portion of the cam means.

8. The reclining device according to claim 7, wherein said connecting lug is formed on a lower end of said downwardly expanding section of said operation lever means toward said cut-away portion on the first end portion of said cam means.

9. The reclining device according to claim 8, wherein in said downwardly expanding section of the operation lever means, said connecting lug is disposed at a point between said second center of rotation and said second end on the operation lever means.

10. The reclining device according to claim 1, wherein said connecting means comprises: a guide hole formed in said downwardly expanding section of said operation lever means, said guide hole being spaced from said second center of rotation on said operation lever means; and a projection formed at said first end portion said cam means, said projection being disposed near said first center of rotation on said cam means, and wherein said projection is inserted slidably in said guide hole.

11. The reclining device whereiing to claim 10, wherein said guide hole is disposed in a lower area of said downwardly expanding section of said operation lever means.

12. The reclining device according to claim 11, wherein in said downwardly expanding section of the operation lever means, said guide hole is disposed at a point between said second center of rotation and said first end on the operation lever.

13. The reclining device according to claim 1, wherein said guide means comprises a projected portion formed on the lock gear means and a guide hole formed in said downwardly expanding section of said operation lever means, such that said projected portion is inserted in and contacted with said guide hole.

14. The reclining device according to claim 1, wherein a spring bias means is provided to cause said operation lever means to tend to rotate towards a non-use position so as to keep said lock gear means in meshed engagement with said gear section of the upper arm.

15. A reclining device for a seat, which includes an upper arm adapted to be fixed to a seat back of the seat and a lower arm adapted to be fixed to a seat cushion of the seat, said upper arm being rotatable with respect to said lower arm, said upper arm having a gear section at a lower end thereof, said reclining device comprising:

a lock gear means rotatable downward or upward on said lower arm to respectively permit meshed engagement or disengagement from said gear section said lock gear means having a contact edge defined at a lower side thereof;

a cam means rotatablg mounted on said lower arm adjacent to said lock gear means, said cam means having a first center of rotation defined therein, and a first end portion and a second end portion, wherein said second end portion includes at least two different cam surfaces, each having a contact area upon which said contact edge of said lock gear means can be stably engaged;

said at least two different cam surfaces including a first cam surfaces spaced from said first center of rotation which rotates said lock gear means upwardly for the meshed engagement with said gear section and a second cam surface spaced from said first center of rotation to permit said iock gear means to be rotated downwardly for disengagement from said gear section;

an operation lever means rotatably provided on said lower arm, said operation lever means having a second center of rotation, a generally rectilinear section defined at a first end thereof and a downwardly expanding section defined at a second end thereof opposite to said first end, such that the second center of rotation is defined between said generally rectilinear section and said downwardly expanding section and is spaced from said first center of rotation;

said downwardly expanding section substantially overlapping said cam means; and connecting means on said downwardly expanding section and said cam means for slidable and continuous engagement between said operation lever means and said cam means to rotate said cam means into meshed engagement or disengagement, whereby rotation of the operation lever means causes said lock gear means to be rotated upwardly and downwardly by rotation of said cam means so as to effect meshed engagement or disengagement between said lock gear means and said gear section;

wherein the reclining device is of a dual type comprising a pair of first and second reclining devices, each being mounted to the respective lateral sides of said seat back, wherein both said first and second devices are basically of a same structure including said lock gear means, said cam means and said connecting means, except that only one of said first and second reclining devices includes said operation lever means, wherein in addition thereto, said first and second reclining device each includes a guide means for assisting in downward rotation of said lock gear means for the disengagement from said gear section of the upper arm, wherein said guide means in said one of said first and second reclining devices is provided between said downwardly expanding section of said operation lever means and lock gear means, while said guide means in another of said first and second reclining devices is provided only at said lock gear means, and wherein an interlocking means is provided between said first and second reclining devices in order to cause said cam means and guide means to be actuated simultaneously in both said first and second reclining devices only through said one operation lever means, to thereby effect the meshed engagement and disengagement of said lock gear means with and from said gear section in both of said first and second reclining devices.

16. The reclining device according to claim 15, wherein said interlocking means comprises an auxiliary lever means provided in said another of said first and second reclining devices, said auxiliary lever means being adapted to engage said guide means in said another of said first and second reclining devices, and a connecting rod having one end connected with said cam means in said one of first and second reclining devices, and having another end connected with said cam means and auxiliary lever means in said another of said first and second reclining devices.

17. A reclining device for a seat, which includes an upper arm adapted to be fixed to a seat back of the seat and a lower arm adapted to be fixed to a seat cushion of the seat, said upper arm being rotatable with respect to said lower arm, said upper arm having a gear section at a lower end thereof, said reclining device comprising:

a lock gear means rotatable downward or upward on said lower arm to respectively permit meshed engagement with or disengagement from said gear section associated with said upper arm, said lock gear means having a contact edge defined at the lower side thereof;

a cam means rotatable mounted on said lower arm, adjacent to said lock gear means, said cam means having a first center of rotation defined therein, first end portion and second end portion, wherein said second end portion includes at least two different cam surfaces, each having a contact area upon which said contact edge of said lock gear means can be stably engaged;

said at least two different cam surfaces including a first cam surface spaced from said first center of rotation which rotates said lock gear means upwardly for meshed engagement with said gear section and second cam surface spaced from said first center of rotation to permit said lock gear means to be rotated downwardly for disengagement from said gear section;

an operation lever means rotatably provided at said lower arm, said operation lever means having a second center of rotation, a generally rectilinear section and a downwardly expanding section, such that the second center of rotation is defined between said generally rectilinear and downwardly expanding section and further spaced from said first center of rotation on said cam means;

said downwardly expanding section substantially overlapping said cam means; and said cam means being of smaller area than that of said downwardly expanding section of said operation lever means and interposed between said lower arm and said downwardly expanding section such that the cam means is substantially rotatable within the area of the downwardly expanding section;

said contact edge of said lock gear means being disposed within the area of said downwardly expanding section of said operation lever means, such that the contact edge may be contacted upon a selected one of said first cam surface and said second cam surface within the area of said downwardly expanding section; and a connecting means for operatively and directly connecting said downwardly expanding section of said operation lever means with said first end portion of said cam means; said connecting means being formed in both said downwardly expanding section and said first end portion of said cam means;

wherein a pin is provided at said lower arm, which corresponds to said center of rotation of said cam means, whereupon said cam means is rotatable on said pin, wherein said pin extends in a direction transversal of both said upper arm and said downwardly expanding section of said operation lever means, and wherein an escapement hole means is defined in said downwardly expanding section such as to allow said pin to move freely therein without interference with said operation lever means.

18. The reclining device according to claim 17, wherein said connecting means is spaced from said center of rotation of said operation lever means and near said center of rotation of said cam means, so that rotation through an angle $\theta 1, \theta'1$ upward or downward of said rectilinear section of said operation lever causes said cam means to rotate through an angle $\theta 2, \theta'2$ which is a multiple larger than the angle $\theta 1, \theta'1$ of rotation of said rectilinear section, thereby permitting both quick orientation of one of said at least two cam surfaces toward said contact edge of said lock gear means, and permitting said contact edge to be ingreased in an area for contact with said one of said at least two cam surfaces.

* * * * *